(12) United States Patent
Tyagi et al.

(10) Patent No.: US 11,379,562 B2
(45) Date of Patent: Jul. 5, 2022

(54) REMOTE SOFTWARE USAGE MONITORING AND ENTITLEMENT ANALYSIS

(71) Applicant: ServiceNow, Inc., Santa Clara, CA (US)

(72) Inventors: Rohan Tyagi, San Jose, CA (US); Julian Michael Flores, Dallas, TX (US)

(73) Assignee: ServiceNow, Inc., Santa Clara, CA (US)

( * ) Notice: Subject to any disclaimer, the term of this patent is extended or adjusted under 35 U.S.C. 154(b) by 456 days.

(21) Appl. No.: 16/565,062

(22) Filed: Sep. 9, 2019

(65) Prior Publication Data
US 2021/0073354 A1 Mar. 11, 2021

(51) Int. Cl.
*G06F 21/10* (2013.01)
*G06F 11/36* (2006.01)

(52) U.S. Cl.
CPC ........ *G06F 21/105* (2013.01); *G06F 11/3668* (2013.01)

(58) Field of Classification Search
CPC .......................... G06F 21/105; G06F 11/3668
USPC ......................................................... 726/26
See application file for complete search history.

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,707,115 B2 * | 4/2010 | Goringe | G06Q 10/10 705/59 |
| 7,716,353 B2 | 5/2010 | Golovinsky | |
| 7,769,718 B2 | 8/2010 | Murley | |

(Continued)

OTHER PUBLICATIONS

"Consuming OpenLM API v4 in your Dashboard", OpenLM Docs, 36 pages.

*Primary Examiner* — Michael S McNally
(74) *Attorney, Agent, or Firm* — Fletcher Yoder PC

(57) ABSTRACT

A computational instance of a remote network management platform may execute a remote access call for a license consolidation server. The remote access call may contain instructions for obtaining concurrent license usage statistics from the license consolidation server. In response to obtaining the concurrent license usage statistics, the computational instance may update a software configuration with the concurrent license usage statistics, where the software configuration contains a license rights allocation for the concurrent software application. Based on the concurrent license usage statistics and the license rights allocations, the computational instance may generate a representation of a graphical user interface that contains an overview pane indicating a utilization of the concurrent software application. Then the computational instance may transmit, to a client device, the representation of the graphical user interface.

20 Claims, 13 Drawing Sheets

(56) References Cited

U.S. PATENT DOCUMENTS

| | | |
|---|---|---|
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Meuller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 2011/0247077 A1* | 10/2011 | Nguyen ................. G07F 17/16 726/26 |
| 2017/0161470 A1* | 6/2017 | Feng ..................... G06F 21/105 |

\* cited by examiner

REMOTE SOFTWARE USAGE MONITORING AND ENTITLEMENT ANALYSIS

BACKGROUND

An enterprise may use many computing devices to efficiently facilitate and manage its various interrelated operations. Each of the computing devices may have one or more software applications installed thereon. Where the software is proprietary, the enterprise may procure licenses for the computing devices to use the software applications. Given this, the enterprise may seek to properly track license rights allocations and usage associated with the software applications, so as to determine whether the license rights usage complies with the license rights allocations and/or with other constraints imposed by the enterprise.

SUMMARY

A managed network may use various software applications to support its operations. Often, these software applications are subject to software license agreements, which indicate how each software application can be used by the managed network. For example, a software application may be subject to a "per-device" license agreement, which specifies a number of computing/server devices on the managed network that are permitted to use the software application.

Managing the relationships between software applications and software licenses can be a complex endeavor. For one, the managed network may use thousands of separate computing devices, each of which may use different software applications. These computing devices may go in and out of service, require different software applications over time, and/or require different hardware configurations over time, among other possibilities. Moreover, certain software applications may be installed and/or uninstalled from certain computing devices without supervision or notice.

To ease this process, the managed network could use the services of a remote network management platform. In particular, the remote network management platform may operate to discover software applications installed on computing devices in the managed network, so as to establish installation counts for the software applications. Then, after a user from the managed network specifies license rights for the software applications, the remote network management platform could compare the installation counts to the license rights. As a specific example, the remote network management platform may discover that 160 instances of ADOBE ACROBAT® are installed on the managed network, when only 150 license rights are available. If this occurs, the remote network management platform may notify the managed network that it is out of compliance with the software license agreement.

While the remote network management platform is helpful, some situations may pose challenges. For example, some software applications may be subject to a concurrent license agreement (otherwise known as a "floating license"). Concurrent license agreements provide a pool of licenses for a software application that can be shared among users. That is, when a user wishes to run a software application subject to a concurrent license agreement they request a license from a licensing server disposed on the managed network. If a license is available from the pool, the licensing server allows the application to run. When the user is finished using the application, or when the allowed license period expires, the license is reclaimed by the licensing server and made available to other authorized users.

Because concurrent licenses are not dedicated to physical computing devices or users on the managed network, the remote network management platform may be unable to discover information about concurrent license usage. While overuse of concurrent licenses may not be a concern because the licensing servers generally don't allow it, the managed network may find it unduly difficult to forecast future software application usage so as to prune underutilized software licenses or obtain more licenses when concurrent license utilization is high. Other problems are also possible.

Disclosed herein is a technical improvement to a remote network management platform that can address these and other issues. According to the disclosed approach, a remote network management platform could integrate with one or more licensing servers disposed on the managed network. In some cases, this integration is facilitated via one or more license consolidation servers. Once the integration is established, the remote network management platform could query each of the one or more licensing servers to obtain information about concurrent licenses usage on the managed network. Advantageously, the disclosed approach allows the managed network to properly track the allocation and usage of concurrent licenses so as to ensure license compliance and forecast future demands for concurrent software applications. Other advantages are also possible.

Accordingly, a first example embodiment may involve a computational instance of a remote network management platform. The computational instance may include persistent storage and may be dedicated to a managed network. The first example embodiment may also involve one or more processors that are configured to perform operations. These operations may include: remotely accessing a license consolidation server using access credentials thereof, where the license consolidation server acquires and stores concurrent license usage statistics for a concurrent software application by obtaining license usage data from at least one licensing server disposed on the managed network. The operations may also include, while remotely accessing the license consolidation server, obtaining the concurrent license usage statistics from the license consolidation server. The operations may also include, in response to obtaining the concurrent license usage statistics, updating a software configuration with the concurrent license usage statistics, where the software configuration is stored in the persistent storage, and where the software configuration contains a license rights allocation for the concurrent software application. The operations may also include, based on the concurrent license usage statistics and the license rights allocations, generating a representation of a graphical user interface containing an overview pane that indicates a utilization of the concurrent software application. The operations may also include, transmitting, to a client device associated with the managed network, the representation of the graphical user interface.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
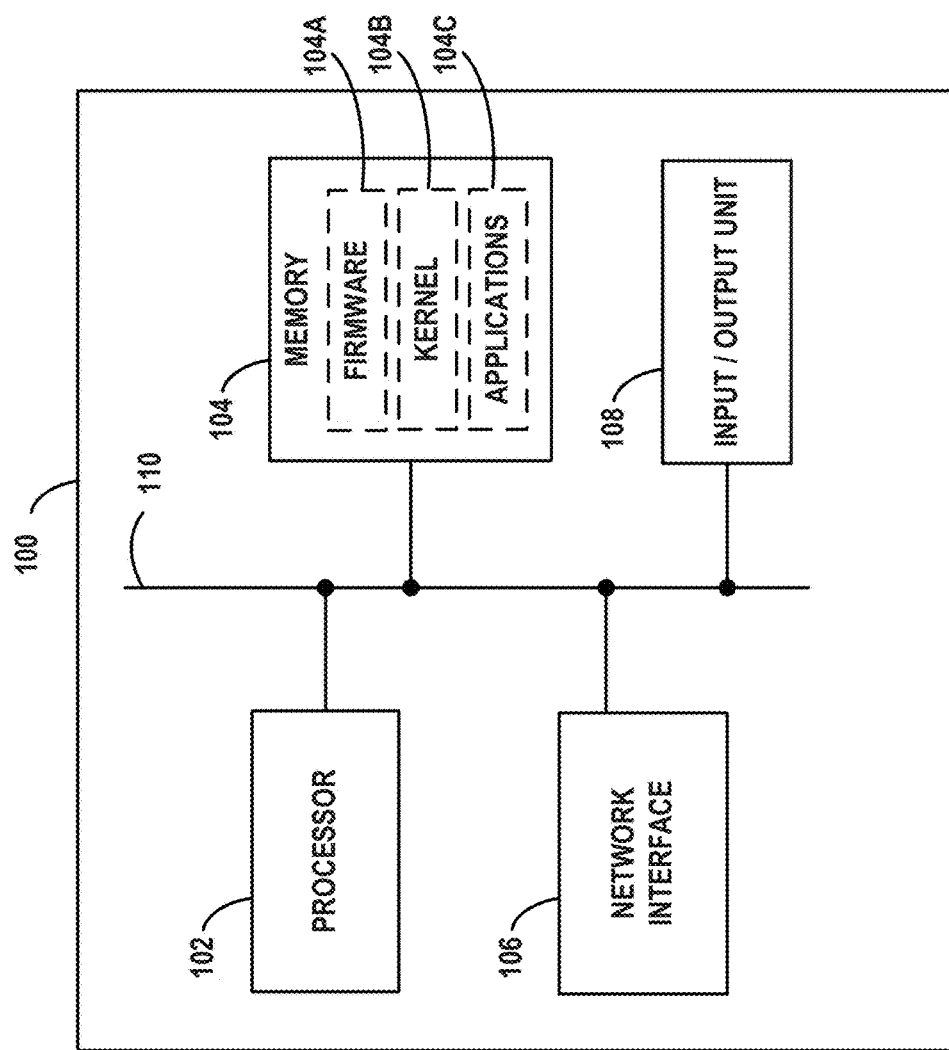
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
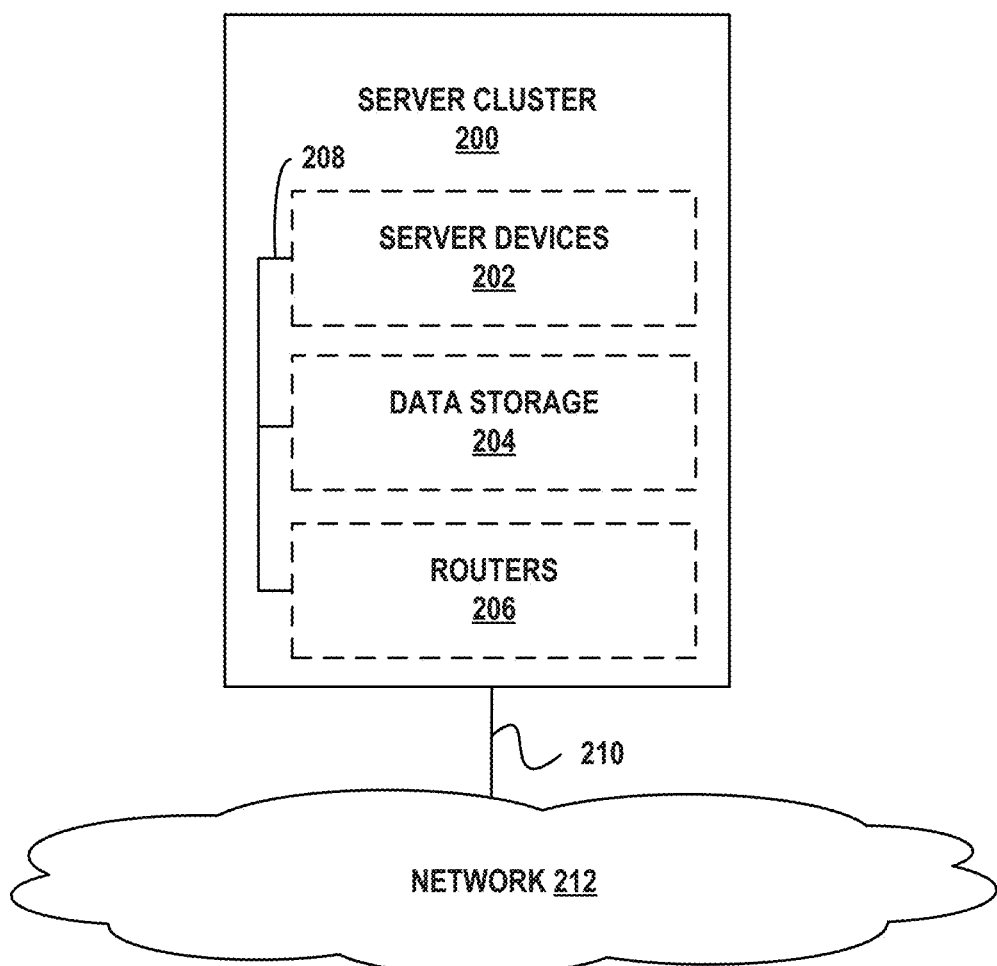
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
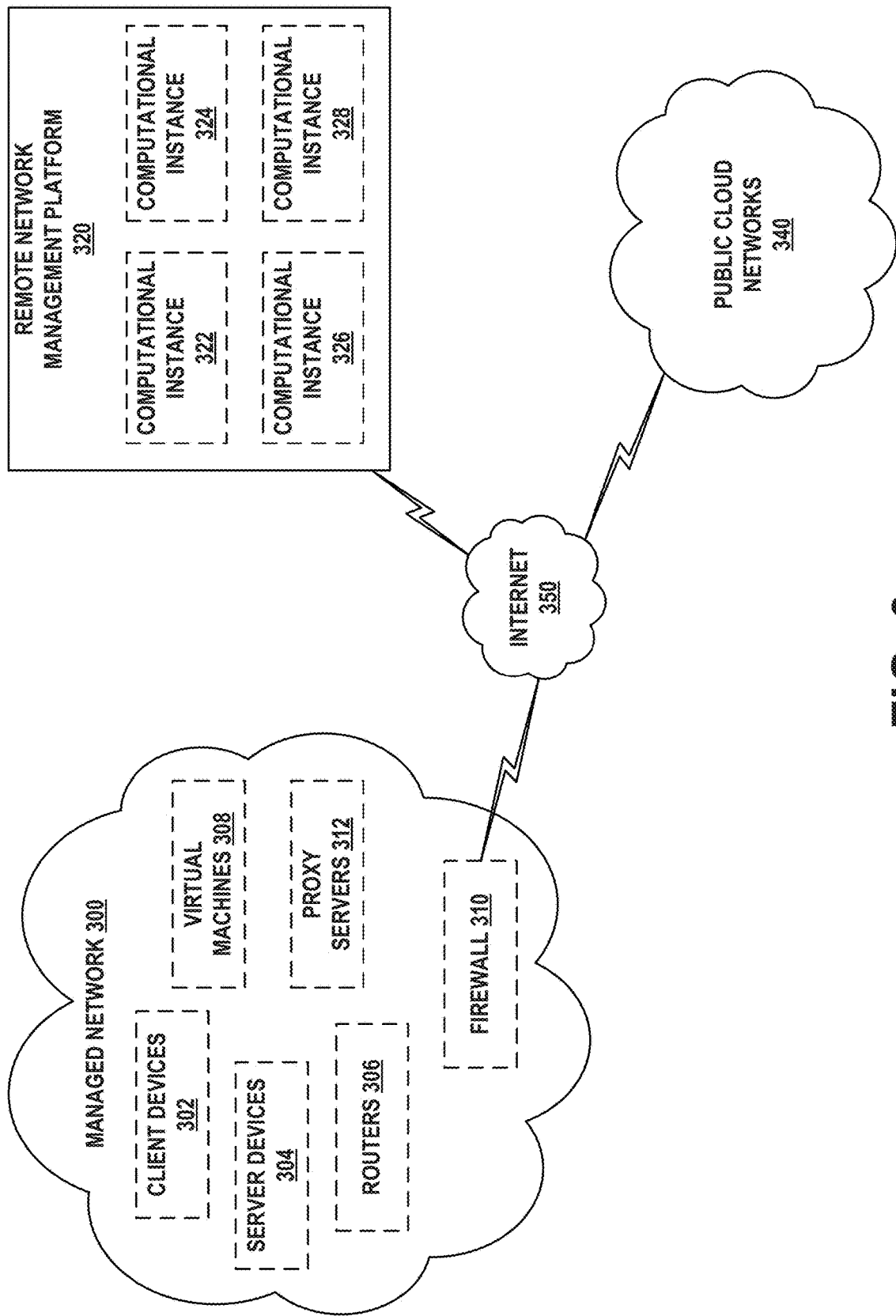
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
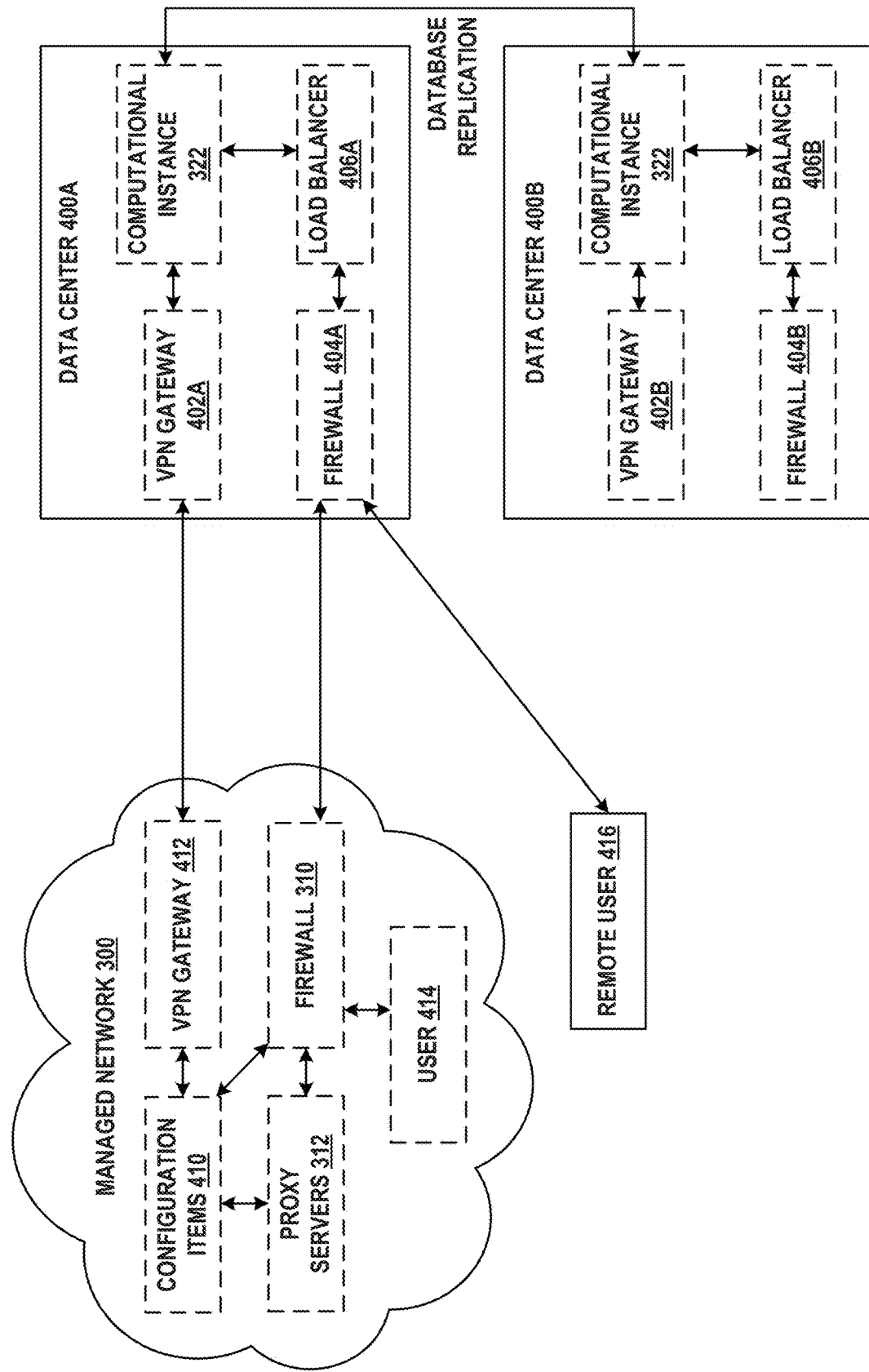
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
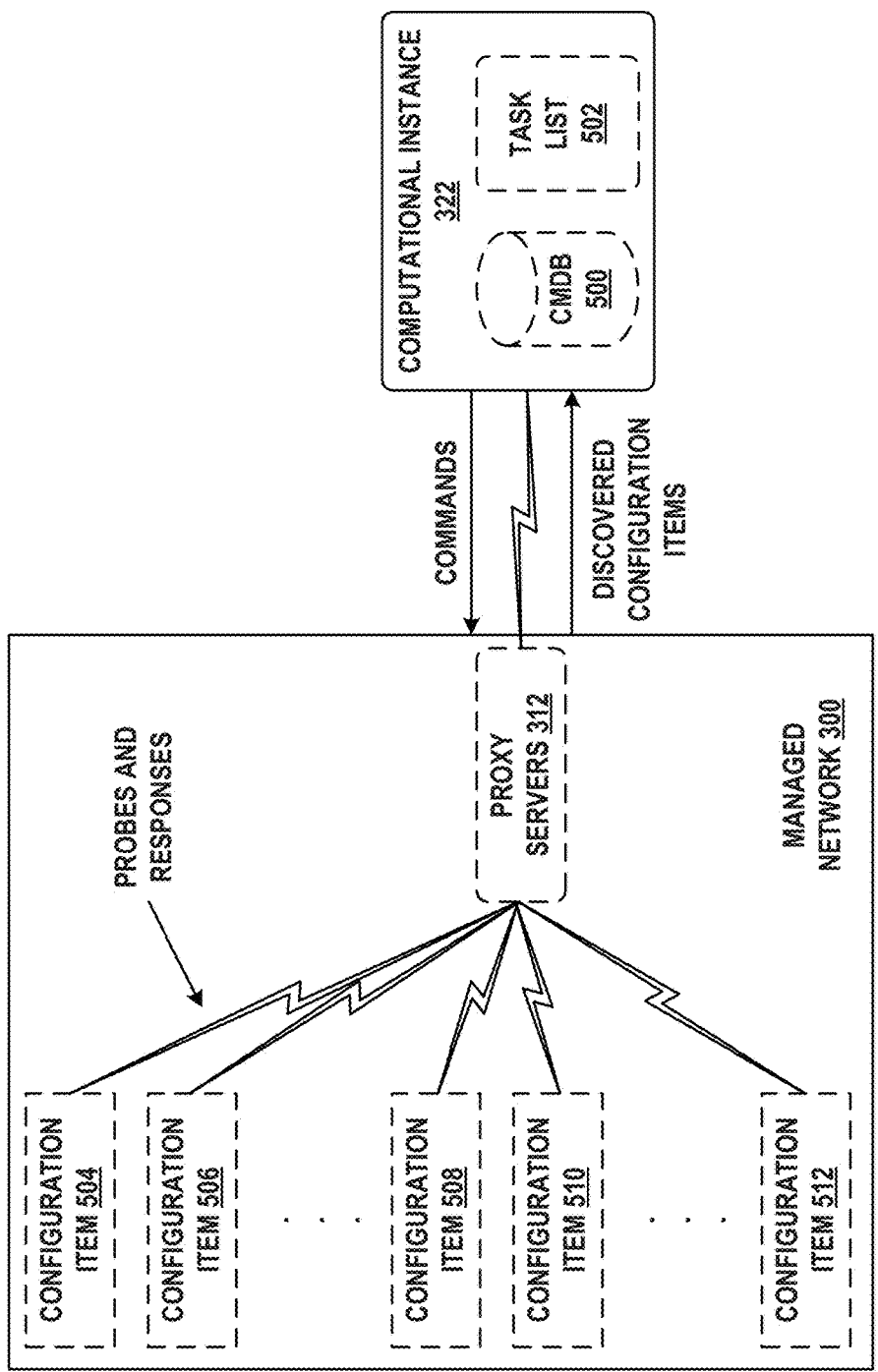
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
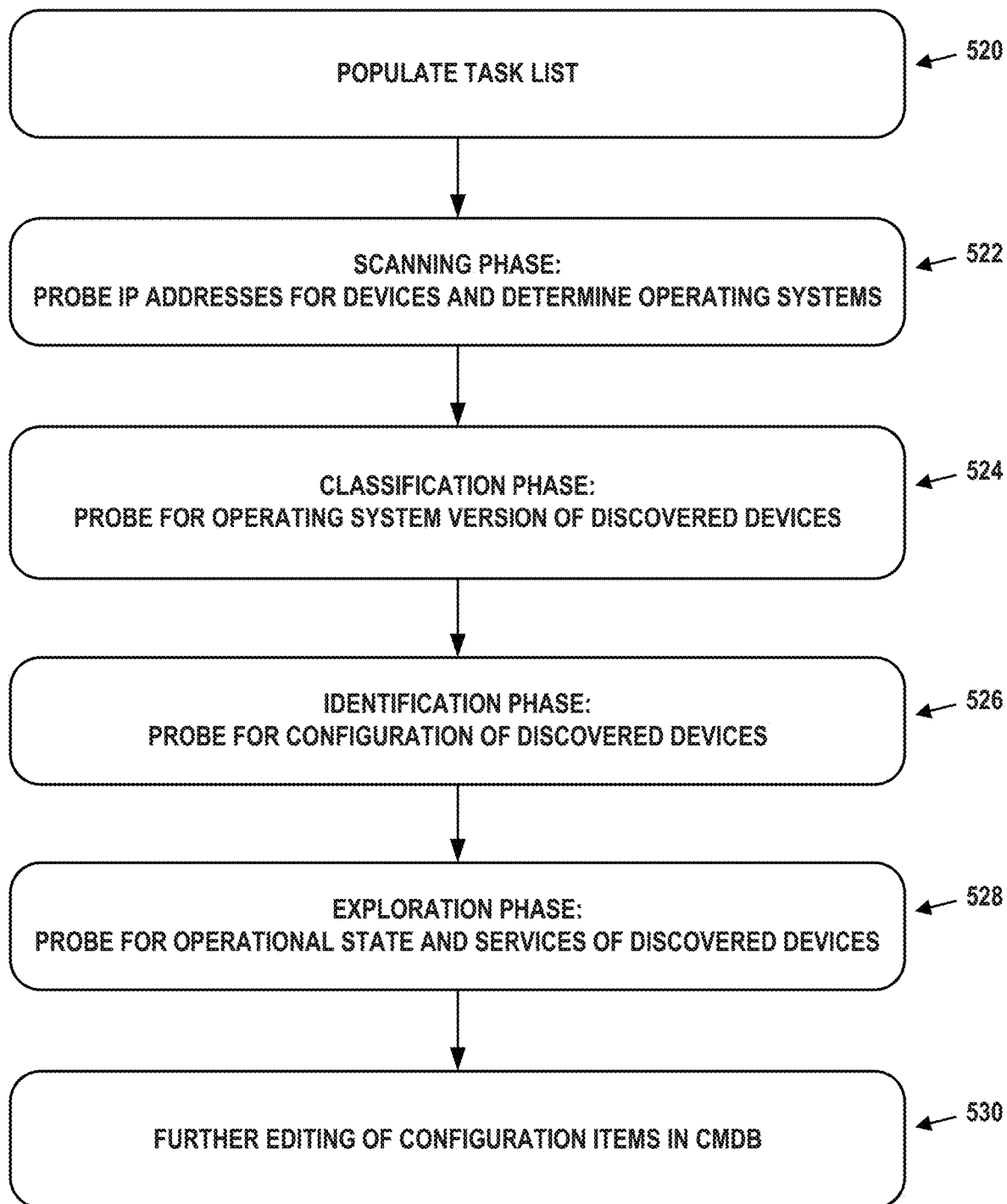
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Systems and Methods for Software License Management

Managed network 300 may use the computing devices described above in relation to FIGS. 1 and 2 to facilitate and manage its many interrelated operations. In turn, the computing devices may rely on software applications to perform tasks. Each computing device may be tasked with performing a set of operations, and accordingly may use a combination of software applications to perform those tasks. While some such software applications may be hosted by remote network management platform 320, others may be installed on the individual computing devices themselves. Such software is often proprietary, and may be licensed in several ways.

By way of example, a software license may include "per-device" license rights, which may specify a number of computing/server devices that are permitted to use the software. As another example, computing devices may include various physical processors, and a software license may include "per-processor" license rights, which may specify a number of physical processors having permission to use the software. Other examples are also possible.

In addition, each software license may specify costs related to use of software. For example, with regard to per-device license rights, a software license may specify a licensing cost per device that uses the software (e.g., a cost of $1,200 for each computing device that has the software installed thereon). In other examples, a software license may have a more complex costs arrangement, as the cost per device, processor, and/or core may vary depending on the number of device, processors and/or cores using the software (e.g., a cost of $500 per processor for the first ten processors that have the software installed thereon and a cost of $450 per processor for the next ten processors that have the software installed thereon, and so on). Other licensing schemes are possible as well.

Regardless of the scheme, managed network 300 may attempt to keep track of which of its computing devices, physical processors, and/or processor cores use what licensed software. In so doing, managed network 300 may determine whether it is in compliance with its various software licenses, whether it is using its licensed software efficiently, and/or whether it should purchase new software licenses.

Remote network management platform 320 may be particularly suited to track such software usage because it is already configured to gather information from computing devices in managed network 300. Specifically, tracking the use of software within managed network 300 may involve determining configuration items in the manner described above in relation to FIGS. 5A through 5B. For example, during identification phase 526 of discovery, computational instance 322 of remote network management platform 320 may determine the configuration of discovered devices, including identification parameters indicative of specific computing devices. Further, during exploration phase 528, computational instance 322 may determine services, such as software applications, of each discovered device. The identification parameters associated with such software applications may indicate on which specific computing device(s) each software application is installed. The identification parameters may additionally or alternatively specify a number of processors or cores of a computing device, a device name, or a named user, associated with each software application. As such, depending on the licensing scheme, the remote network management platform 320 could count software installations per-device, per-processor, or per-core, among other options.

Further, remote network management platform 320 could determine to what extent managed network 300 is in compliance with its software licenses. For example, remote network management platform 320 may run discovery on computing devices within managed network 300 to determine how many times each software application has been installed as discussed (e.g., how many times each software application is installed on devices within managed network 300). In some cases, remote network management platform 320 may also determine how many users from managed network 300 access each installed software application. Then, remote network management platform 320 may compare the number of software installations with the software license rights to determine whether the software application(s) are in or out of compliance.

To facilitate this process, remote network management platform 320 could provide for establishment of software configurations (sometimes referred to as "software models"). A given software configuration could track license rights allocations and usage associated with a particular software application. Remote network management platform 320 could use the software configuration to determine whether license rights usage for a particular software application complies with the license rights allocations for the particular software application. Thus, software configurations could help an enterprise figure out whether usage of software applications complies with licenses associated with the software applications.

Remote network management platform 320 could provide for establishment of software configurations in various ways. For example, remote network management platform 320 may provide, to a client device, a representation of a graphical user interface (GUI) that includes feature(s) for establishing software configuration(s). Through this GUI, a user of the client device may provide input to specify identifying information (e.g., a respective publisher, title, version, and/or edition) and license right allocations for a given software application, so as to establish an initial software configuration for the given software application. Then, remote network management platform 320 could update the initial software configuration to specify an installation count for the given software application according to the above-mentioned discovery, thereby causing the updated software configuration to indicate a license rights usage for the given software application.

In some embodiments, remote network management platform 320 may automatically generate software configurations. To enable this, remote network management platform 320 may store attributes for one or more software configurations in CMDB 500 (or perhaps another database). Attributes for a software configuration may include the particular publisher, title, version, and/or edition of the software configuration. During discovery, remote network management platform 320 may determine whether any of the stored software configurations respective attributes match discovered attributes associated with a particular software application. If all attributes of a particular stored software configuration match, then remote network management platform 320 may use the particular stored software configuration as an initial software configuration for the particular software application.

If none of the stored software configurations have matching attributes, then remote network management platform 320 may generate a new software configuration the particular software application. This process may involve (i) gathering attributes (e.g., a particular publisher, tile, version, and/or edition) for the particular software configuration via a GUI and updating the CMDB 500 to include the gathered attributes associated with the new software configuration.

Once determining an extent to which managed network 300 is in compliance with its software licenses, the remote network management platform 320 may perform an action based on this determined extent. For example, remote network management platform 320 may provide, via a GUI, a recommendation to purchase additional licenses, to install a software application on more devices, or to uninstall the software application from certain computing devices within managed network 300. In some examples, remote network management platform 320, upon determination that certain criteria have been met, may automatically purchase additional software licenses, or reorganize which devices, processors, or cores upon which the software applications are installed. Various other examples are also possible.

Although establishment of software configurations can help managed network 300 track software license compliance, various problematic situations could still arise. In particular, managed network 300 may utilize some software applications subject to concurrent license agreements. Such agreements generally provide a pool of licenses that can be "checked-in" and "checked-out" by users from managed network 300. More specifically, when a user wishes to run a software application subject to a concurrent license agreement, the user requests a license from a central licensing server located on managed network 300. If a license is available from the pool, the central licensing server allows the application to run. When the user is finished using the application, or when an allowed license period expires, the license is reclaimed by the central licensing server and made available to other users. Common software applications subject to concurrent license agreement include AUTOCAD® and ARCGIS®. Note that for the purposes of brevity, software applications subject to a concurrent license agreement may be referred to herein as "concurrent software applications" and software licenses associated with software applications subject to a concurrent license agreement may be referred to herein "concurrent licenses".

By design, concurrent software agreements decouple the installation of a concurrent software application from the license required to run the concurrent software application. For example, managed network 300 may have AUTOCAD® installed on 500 computing devices, but may only have licenses rights allocations for 150 AUTOCAD® licenses. Such an arrangement would be entirely compliant in a concurrent software agreement, as long as the number of licenses of AUTOCAD® that are checked out at a given time does not exceed 150. Yet this arrangement may cause difficulties for remote network management platform 320, which generally expects a one to one relationship between licenses and software applications installed in managed network 300. For example, in the scenario above, remote network management platform 320 may determine that managed network 300 is out of compliance because the number of installations of AUTOCAD® exceeds the number of license rights allocations. But this determination would be erroneous. Further, because remote network management platform 320 is unable determine when a concurrent license is checked out of/checked into a central licensing server, the remote network management platform 320 may provide managed network 300 with an inaccurate representation of actual license usage. Other issues with managing concurrent licenses are also possible.

The present description discloses embodiments to address these and other issues. In particular, the systems and methods herein integrate remote network management platform 320 with one or more central licensing servers that respectively manage a pool of concurrent licenses on behalf of managed network 300. Through this integration, remote network management platform 320 may accurately determine usage statistics and perhaps other information about concurrent licenses on managed network 300. In some cases, the integration is facilitated through a $3^{rd}$ party consolidation server. Using the information received from the one or more licensing severs, remote network management platform 320 could update software configurations to specify usage counts for concurrent software applications. Then, remote network management platform 320 could provide, via a GUI, a recommendation to purchase additional licenses, to reduce underutilized licenses, and so on. Advantageously, the embodiments herein enable remote network management platform 320 to provide accurate information about concurrent licenses usage to managed network 300. Other advantages are also possible and may be understood from the disclosure herein.

Figure 6:
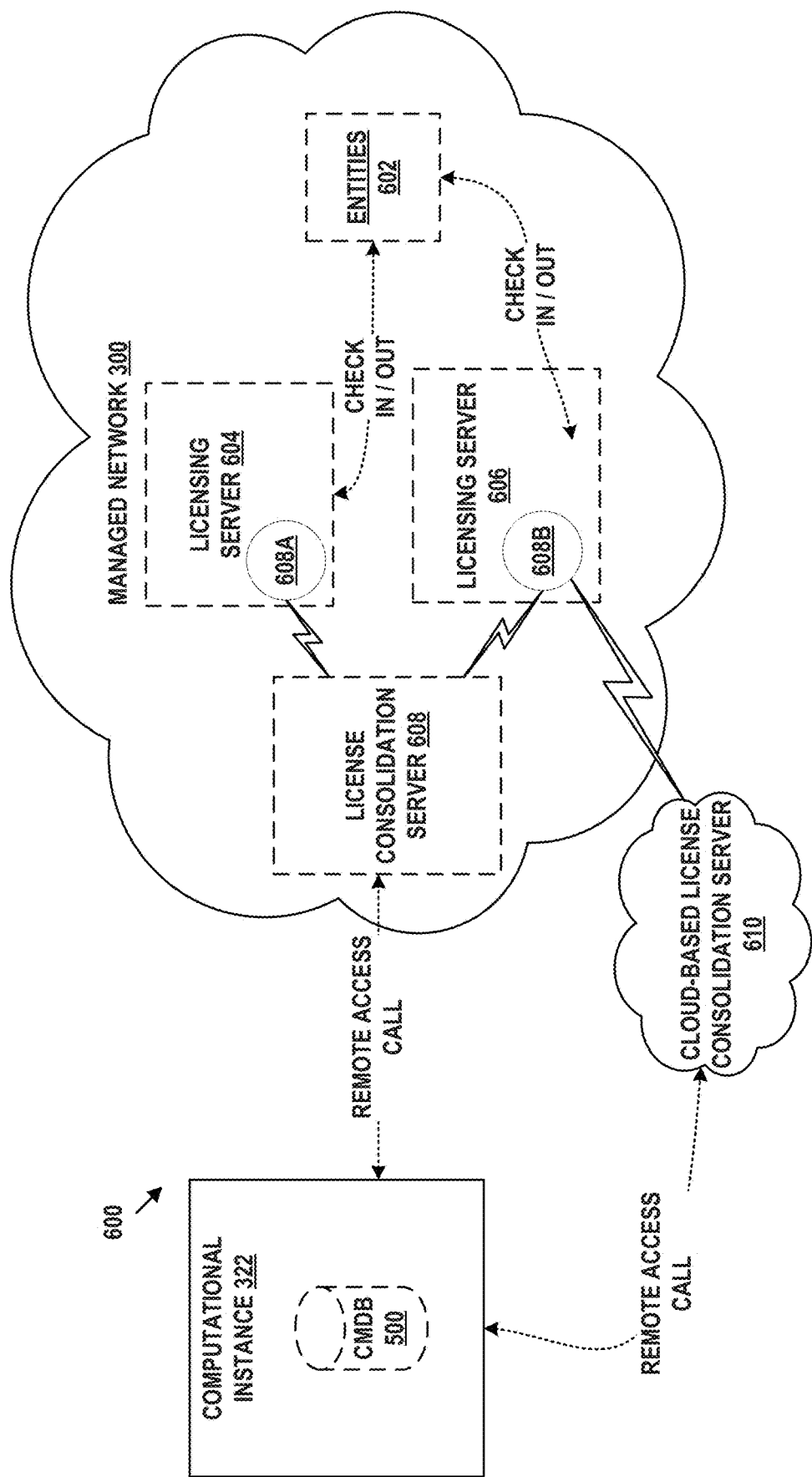
FIG. 6 illustrates network architecture 600, in accordance with example embodiments.

FIG. 6 illustrates network architecture 600, in accordance with example embodiments. Network architecture 600 may facilitate the discovery and management of concurrent licenses. Network architecture 600 includes managed network 300 and computational instance 322, which are perhaps connected by way of Internet 350 (not shown).

Managed network 300 includes entities 602, licensing server 604, licensing server 606, and license consolidation server 608. Managed network 300 may also include other devices and software applications as described above, but these are omitted from FIG. 6 for purposes of simplicity.

Entities 602 can include, but are not limited to, one or more devices, computer processors, and/or computer processor cores disposed on managed network 300. Entities 602 may have installed thereon concurrent software applications, but may be unable to run the applications without first checking out a concurrent license from licensing server 604/606.

Licensing servers 604 and 606 may include various devices and software services that manage and distribute concurrent licenses. In particular, licensing servers 604/606 may maintain a pool (e.g., one or more) of concurrent licenses. Licensing servers 604/606 distribute concurrent licenses from the pool to entities 602 so that entities 602 can run concurrent software applications. The size of the pool may depend on license rights allocated to managed network 300. In some embodiments, licensing servers 604/606 each manage concurrent licenses for a single concurrent software application. For example, licensing server 604 may manage concurrent licenses for AUTOCAD® and licensing server 606 may manage concurrent licenses for ARCGIS®. In some embodiments, licensing servers 604/606 manage concurrent licenses for a plurality of concurrent software applications. For example, licensing server 604 may manage concurrent licenses for AUTOCAD® and ARCGIS®.

When entities 602 wish to run a concurrent software application CSA_A, they send a check-out request to licensing servers 604/606. In response, licensing servers 604/606 may perform the following "check-out" operations:
(1) GET NUM_AVAILABLE_LICENSES for CSA_A from memory.
(2) If NUM_AVAILABLE_LICENSES<1, return NONE to entities 602.
(3) Else: decrement NUM_AVAILABLE_LICENSES, get available license LICENSE_A for CSA_A from memory, and return LICENSE_A to entities 602.
(4) Set allowed license period (TTL_A) for LICENSE_A=X, set the LICENSE_A=UNAVAILABLE.

When entities 602 are done using concurrent software application CSA_A, or when the allowed license period TTL_A expires, they send a check-in request to licensing servers 604/606. In response, licensing servers 604/606 may perform the following "check-in" operations:
(1) RECEIVE check-in request from entities 602 for LICENSE_A
(2) SET LICENSE_A=AVAILABLE
(3) increment NUM_AVAILABLE_LICENSE for CSA_A.

These "check-out"/"check-in" operations allow licensing servers 604/606 to properly maintain and distribute a pool of concurrent licenses to entities 602. Licensing servers 604/606 may also track these operations for later analysis. For example, licensing servers 604/606 can monitor and persist a current value of NUM_AVAILABLE_LICENSE, the number of times NONE is returned to entities 602, and a current value of LICENSE_A, among other possibilities. These tracked operations may be referred to herein as concurrent license usage statistics.

License consolidation server 608 may include devices and applications that collect concurrent license usage statistics from licensing servers 604/606. More particularly, license consolidation server 608 acts as an aggregation server for all licensing servers disposed in managed network 300. Statistics obtained by license consolidation server 608 from licensing servers 604/606 may include, but are not limited to, the number of available licenses for a concurrent software application (e.g., the value of NUM_AVAILABLE_LICENSE), whether a particular concurrent license is currently available (e.g., the value of LICENSE_A), and so on.

To obtain statistics from licensing servers 604/606, license consolidation server 608 may use software agent 608A and software agent 608B. As used herein, a software agent refers to a software application associated with license consolidation server 608, but operating on a licensing server within managed network 300. Managed network 300 may respectively install software agents 608A/608B onto licensing servers 604/606 on behalf of license consolidation server 608. Upon installation, software agents 608A/608B may be granted root privileges to licensing servers 604/606. That is, software agents 608A/608B can read, modify and execute programs/files/directories on licensing servers 604/606. Software agents 608A/608B can leverage these root privileges to obtain statistics from licensing servers 604/606. For example, software agents 608A/608B may operate to read log files and intercept packet data related to the "check-out"/"check-in" operations described above. Then, software agents 608A/608B may transmit this data to license consolidation server 608.

Cloud-based license consolidation server 610 may be operated by the same entity that operates license consolidation sever 608. In examples, cloud-based license consolidation server 610 may provide the same services as license consolidation server 608, but in a cloud based environment physically separate from managed network 300.

Both license consolidation server 608 and cloud-based license consolidation server 610 may provide an application programming interface (API) for querying concurrent license usage statistics aggregated from licensing servers on managed network 300. This API may be a representational state transfer (REST) API using HTTP, for instance, but other types of APIs may be used. As an example, given that license consolidation server 608/cloud-based license consolidation server 610 are operated by OPENLM®, a request URL to retrieve information about currently used concurrent software licenses may take on the following form: "http://[openlm_server]:7020/OpenLM.Server.Services/AdminAPI/CurrentlyConsumedLicenses", where [openlm_server] is an IP address for license consolidation server 608 on managed network 300. The OPENLM® example above is for purposes of illustration and not limiting. Other query formats and APIs may exist.

Network architecture 600 also contains computational instance 322, which includes CMDB 500. As described above, computational instance 322 may be part of remote network management platform 320 and may include various devices and software services used to remotely administer aspects of managed network 300.

As shown by the dotted lines in FIG. 6, computational instance 322 may execute a remote access call on license consolidation server 608/cloud-based license consolidation server 610. Generally speaking, a remote access call is a series of operations that instruct a software application to access data from another software application/computational entity. In some cases, remote access calls may involve an API call. For example, a remote access call may specify what credentials to use to access license consolidation server 608/cloud-based license consolidation server 610, what data therein to obtain (e.g., which API endpoints to query), and what tables in CMDB 500 to populate with the obtained data. Executing a remote access call may also be referred to as "remotely accessing".

Figure 7:
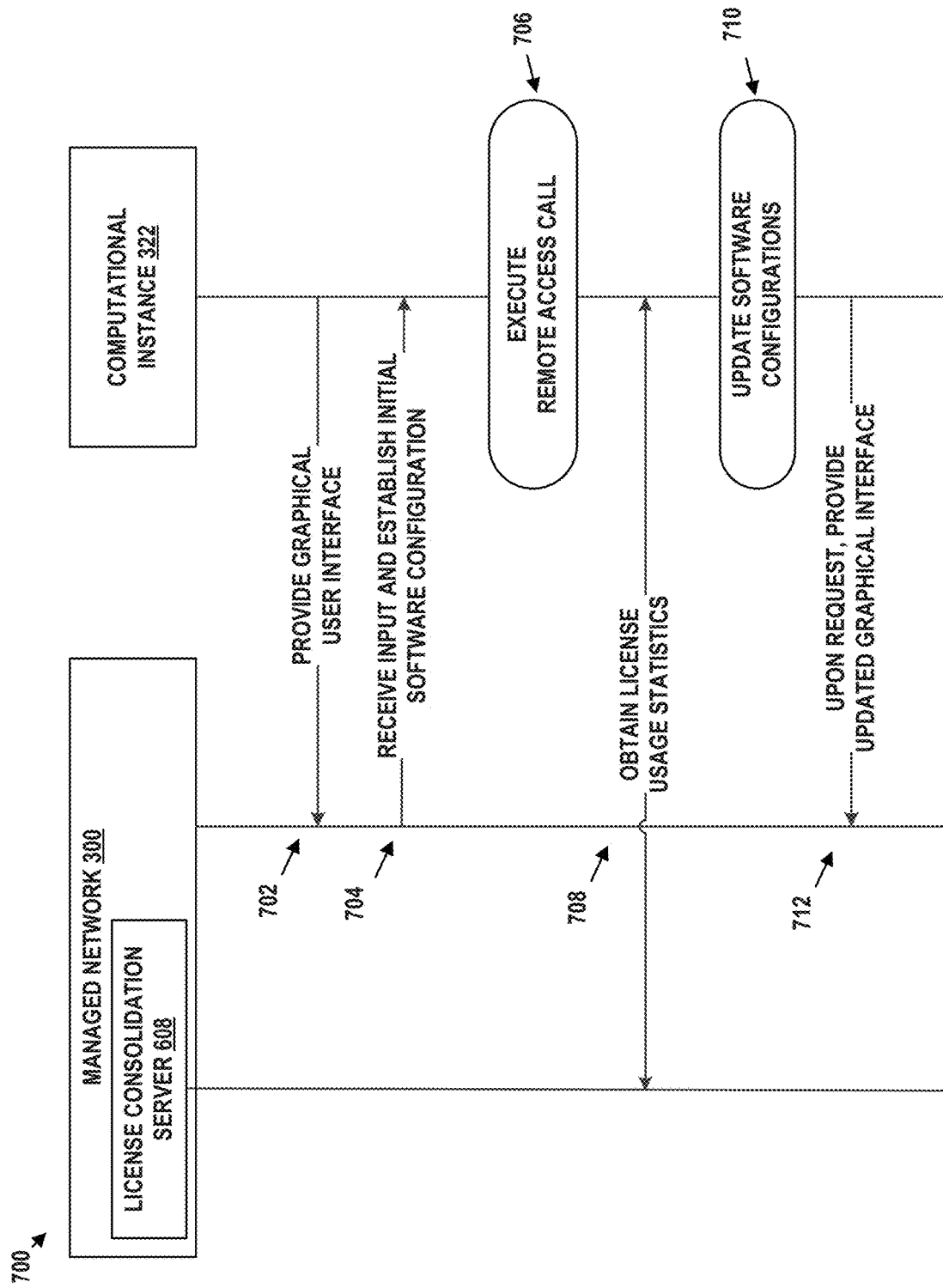
FIG. 7 depicts a message flow, in accordance with example embodiments.

FIG. 7 depicts message flow 700, in accordance with example embodiments. In message flow 700, computational instance 322 can initialize a software configuration and then update the software configuration with statistics received from license consolidation server 608. By way of example, message flow 700 may utilize computational instance 322 and managed network 300 during operation. However, additional components, steps, or blocks, may be added to message flow 700. Also note that while the message flow 700 may utilize license consolidation server 608, the steps below may be similarly applied to cloud-based license consolidation server 610.

At step 702, computational instance 322 provides a GUI to a user from managed network 300. The GUI may include feature(s) for establishing software configuration(s). The user from managed network 300 may provide input into the GUI to specify identifying information (e.g., a respective publisher, title, version, and/or edition) and license right allocations for a given concurrent software application. In some cases, step 702 may be prompted by the user from managed network 300, for example, by requesting the GUI from computational instance 322. At step 704, computational instance 322 receives the input from the GUI and establishes an initial software configuration for the given concurrent software application.

At steps 706 and 708, computational instance 322 executes a remote access call to obtain usage statistics for one or more licensing servers disposed on managed network 300. This is facilitated by way of license consolidation server 608. In particular, the remote access call may operate to query one or more REST APIs of license consolidation server 608, specifying authentication credentials and other parameters to determine the concurrent license usage statistics. In response, license consolidation server 608 may provide concurrent license statistics specified by the query. Notably, since license consolidation server 608 may represent one out of many license consolidation servers used by manage network 300, the process of steps 706 and 708 may repeat for any number of different license consolidation servers.

At step 710, computational instance 322 updates the initial software configuration with the concurrent license statistics ascertained in steps 706 and 708.

At step 712, computational instance 322 provides a representation of an updated graphical interface to the user from managed network 300. The updated interface may contain information related to the updated software configuration, including, but not limited to, recommendations to purchase additional licenses, to reduce underutilized licenses, and so on. The recommendations may be established by comparing the concurrent license statistics discovered in steps 706/708 to the license right allocations entered in step 702. Examples of graphical interfaces are presented below. In some embodiments, steps 702 and 712 may alternatively involve the user requesting and receiving the representation of the updated graphical interface from computational instance 322.

VI. Example Graphical Interfaces

As described herein, the term "pane" may refer to a GUI component that contains one or more locations in which to display information, and/or one or more user-selectable items such as buttons or tabs. In some embodiments, a pane may be equivalent to, or contained within, a page or a GUI window, though such a window may contain multiple panes. Buttons and/or tabs may be graphical control elements that display additional information within the pane. The GUIs and/or panes described herein may be provided to users at step 712 of message flow 700 or when they access a computational instance on a remote network management platform, such as computational instance 322 within remote network management platform 320 as described in FIG. 3.

As previously discussed, management of software licenses can be a complex task. The may be especially so with concurrent licenses that can be checked out/checked in by users at various times, for various lengths of time, and so on. The GUIs herein address these issues by way of a series of panes that enable efficient review of pertinent information about concurrent license usage within managed network 300. The example panes shown in FIGS. 8A, 8B, 8C, and 8D may organize and arrange the information for concurrent licenses using graphics with intuitive visuals and easy to understand metrics. As a result, concurrent licenses can be more effectively managed, resulting in a maximum cost savings for managed network 300.

Figure 8A:
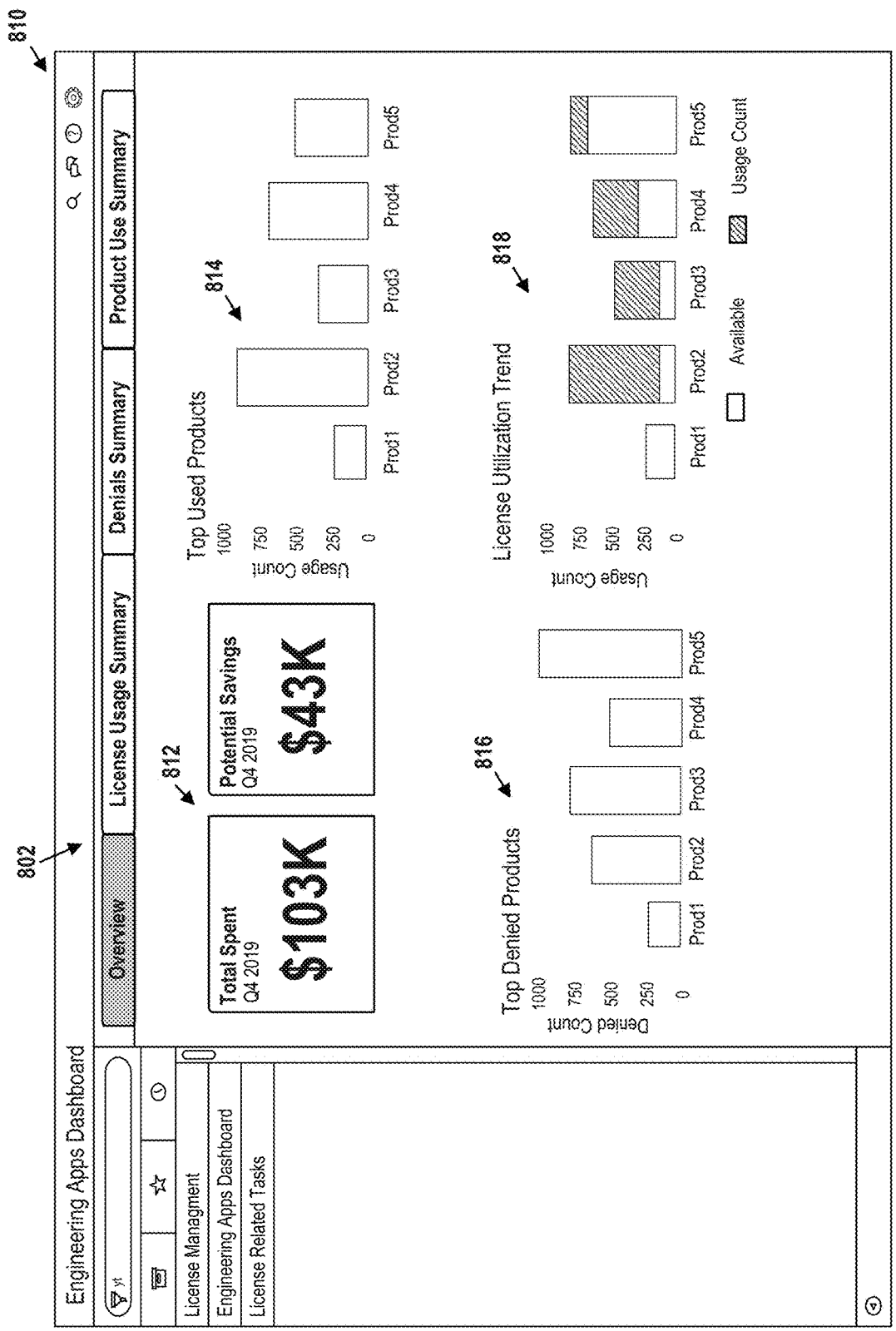
FIGS. 8A-8D depict panes of web pages, in accordance with example embodiments.

FIG. 8A depicts overview pane 810, in accordance with example embodiments. Overview pane includes summary

812, top used products graph 814, top denied product graph 816, and license utilization graph 818. Overview pane also includes navigation bar 802, which includes tabs for "Overview", "License Usage Summary", "Denials Summary", and "Product Use Summary". Notably, the tab for "Overview" is shown in a dark color background to indicate that this tab's information is currently displayed.

Summary 812 depicts summarized information on the total spent and the potential savings with respect to managed network 300. The total spent may relate to the total amount spent by managed network 300 on the concurrent licenses, while the potential savings may relate to the total amount that managed network 300 could save on concurrent licenses. Computational instance 322 may determine these metrics by comparing license rights allocations to concurrent license usage statistics. As an example, managed network 300 may have purchased 150 licenses for a given concurrent software application, but usage statistics from license manager server 608 may indicate that only 100 licenses for the given concurrent software application are typically used. Accordingly, managed network 300 can potentially save on 50 licenses. As shown in FIG. 8A, the total amount spent for all concurrent licenses is $103,000 and the potential savings is $43,000.

Top used products graph 814 summarizes usage counts for one or more concurrent software applications (referred to in the Figures as "products"). As used herein, a usage count refers to the total amount of "check-outs" for a given concurrent software application. As shown, product 2 is shown to have the highest usage rate, followed by product 4, then product 5, then product 3, and finally product 1. To determine usage rates, remote network management platform 320 may query license consolidation server 608/cloud-based license consolidation server 610 for information on which concurrent software applications are checked out the most frequently.

Top denied products graph 816 summarizes denial counts for one or more concurrent software applications. As referred to herein, a denial count refers to a situation when a user wishes to check out a concurrent license from a pool, but cannot because the pool does not have any available licenses to distribute. FIG. 8A shows that product 5 has the highest denial count, followed by product 3, then product 2, then product 4, and finally product 1. To determine denial counts, remote network management platform 320 may query license consolidation server 608/cloud-based license consolidation server 610 for information on how many times a concurrent software application has been denied.

License utilization graph 818 summaries the utilization of one or more concurrent software applications. A utilization for a given concurrent software application is determined by comparing usage counts for the given application to the number of license right allocations (e.g., "available" licenses) for the given application. FIG. 8A shows that product 2 has the highest utilization, followed by product 3, then product 4, then product 5, and finally product 1.

Figure 8B:
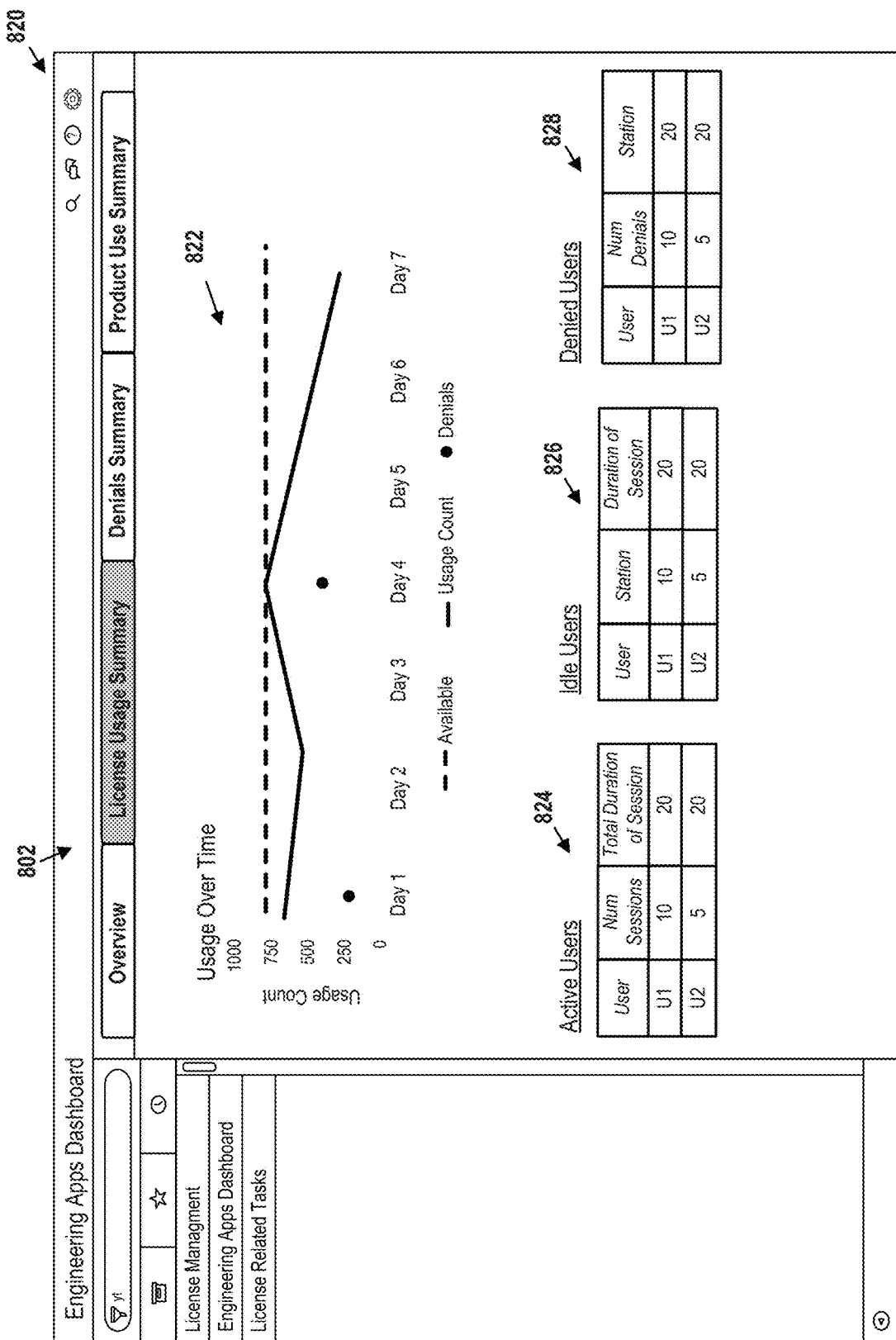

FIG. 8B depicts license usage summary pane 820, in accordance with example embodiments. License usage summary pane 820 includes usage graph 822, active users table 824, idle users table 826, and denied users table 828. Like overview pane 810, license usage summary pane 820 also includes navigation bar 802, which includes tabs for "Overview", "License Usage Summary", "Denials Summary", and "Product Use Summary". Notably, the tab for "License Usage Summary" is shown in a dark color background to indicate that this tab's information is currently displayed.

Usage graph 822 displays a data plot of usage counts and license right allocations over some period of time. As shown in FIG. 8B, the number of rights owned and rights used for a given concurrent software application varied over time. Particularly, in Days 1-3 there was an under-utilization of licenses, at Day 4 utilization was at its peak, and then in Days 5-7 there again was an under-utilization of licenses. Graph 822 may be beneficial as it allows a user to see the utilization of a concurrent software application over time, which may help the user choose an appropriate remediation action.

Active users table 824 may be a detailed list-view of active users on managed network 300. As used herein, an active user refers to a user from managed network 300 that checks out a concurrent license and proceeds to actively use (e.g., run process or perform operations with) the concurrent software application associated with the checked out license. It may be advantageous for remote network management platform 320 to track active users because they genuinely use the checked out license. Each row in active users table 824 may include details related to an active user, including (i) the active user's ID, (ii) the number of sessions for the active user, and (iii) the total duration of all the sessions for that user. As referred to herein, a session refers to the period of time from when a user checks out a concurrent license to when the user checks in the concurrent license.

Idle users table 826 may be a detailed list-view of idle users on managed network 300. As used herein, an idle user refers to a user from managed network 300 that checks out a concurrent license and does not actively use (e.g., does not run process or perform operations with) the concurrent software application associated with the checked out license. It may be advantageous for remote network management platform 320 to track idle users because they do not genuinely use the checked out license, thereby wasting the license. Each row in active users table 824 may include details related to an idle user, including (i) the idle user's ID, (ii) an ID of a computing device associated with the idle user, and (iii) the total duration of the idle session for that user.

In some embodiments, idle users may include users who check out a concurrent license and then minimally use the concurrent software application associated with the checked out license. For example, a user may check out a concurrent license for ten hours, but may only use the concurrent software application associated with the checked out license for a few minutes. The definition for minimal use may be dynamically configured by users from managed network 300. As an example, minimal use may be defined as any user who checks out a concurrent license for X hours and then uses the concurrent software application associated with the checked out license for 0.2X hours or less. Other definitions are also possible.

Denied users table 828 may be a detailed list-view of denied users on managed network 300. The idea here is that it may be advantageous for remote network management platform 320 to track denied users as this helps determine if additional licenses should be purchased. Each row in denied users table 828 may include details related to a denied user, including (i) the denied user's ID, (ii) an ID of a computing device associated with the denied user, and (iii) the total number of denials for the denied user.

Figure 8C:
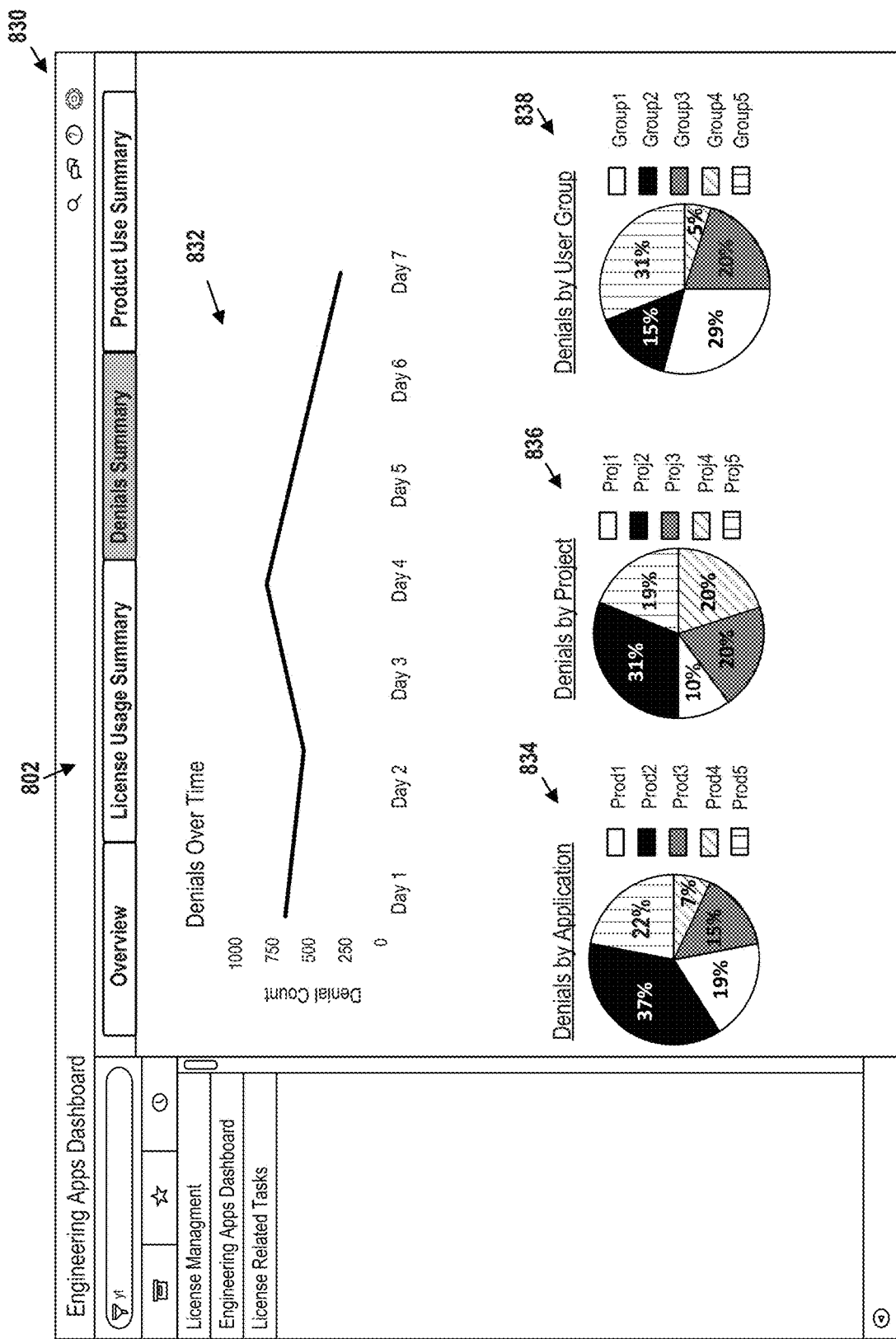

FIG. 8C depicts denials summary pane 830, in accordance with example embodiments. Denials summary pane 830 includes denials graph 832, denials by application chart 834, denials by project chart 836, and denials by user group chart 838. Like the previous panes, denials summary pane 830 also includes navigation bar 802, which includes tabs for "Overview", "License Usage Summary", "Denials Summary", and "Product Use Summary". Notably, the tab for "Denials Summary" is shown in a dark color background to indicate that this tab's information is currently displayed.

Denials graph 832 is a line graph depicting the total denials number of denials for a given day, with the number of denials on the y-axis and the day on the x-axis.

Denials by application chart 834 is a pie chart depicting the total denials per concurrent software application. As shown, product 2 has the highest proportion of denials, followed by product 5, then product 1, then product 3, and finally product 4.

Denials by project chart 836 is a pie chart depicting the total denials per project. As referred to herein, a project is a grouping of concurrent software applications that are used in unison to achieve a predefined goal. A project may include, for example, a "Engineering Project", which uses both AUTOCAD® and ARCGIS® to achieve a goal. The idea here is that it may be advantageous for remote network management platform 320 to track which projects are suffering from the most denials. As shown, project 2 has the highest proportion of denials, followed by projects 3 and 4, then project 5, and finally project 1.

Denials by user group chart 838 is a pie chart depicting the total denials per a user group. As referred to herein, a user group is a set of users on managed network 300 that belong to the same organizational entity. User groups may include, for example, the "Finance Team", the "HR Team", or the "IT Team". The idea here is that it may be advantageous for remote network management platform 320 to track which user groups are getting denied the most. As shown, user group 5 has the highest proportion of denials, followed by user group 1, then user group 3, then user group 2, and finally user group 4.

Figure 8D:
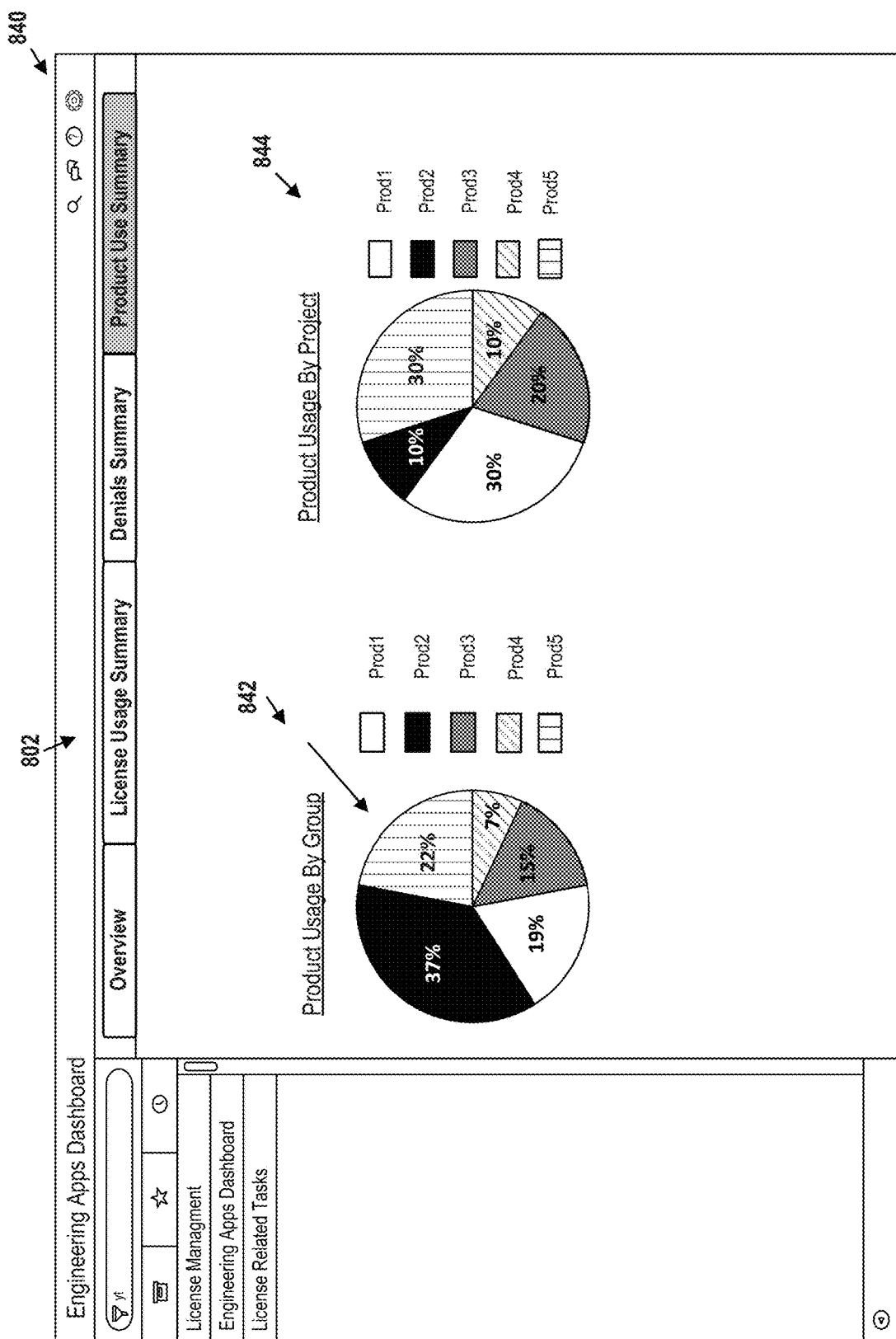

FIG. 8D depicts product use summary pane 840, in accordance with example embodiments. Product use summary pane 840 includes product usage by group chart 842 and product usage by project chart 844. Like the previous panes, denials summary pane 840 also includes navigation bar 802, which includes tabs for "Overview", "License Usage Summary", "Denials Summary", and "Product Use Summary". Notably, the tab for "Product Use Summary" is shown in a dark color background to indicate that this tab's information is currently displayed.

Product usage by group chart 842 is a pie chart depicting total product usage for a particular user group on managed network 300. As shown, product 2 has the highest proportion of usage in the particular user group, followed by product 5, then product 1, then product 3, and finally product 4.

Product usage by project chart 844 is a pie chart depicting total product usage for a particular project on managed network 300. As shown, products 5 and 1 have the highest proportion of usage in the particular project, followed by product 3, and finally products 2 and 4.

Note that the panes above are presented merely for purposes of illustration and are not intended to be limiting. Other panes and/or web pages including alternative arrangements of information may also exist.

VII. Example Operations

Figure 9:
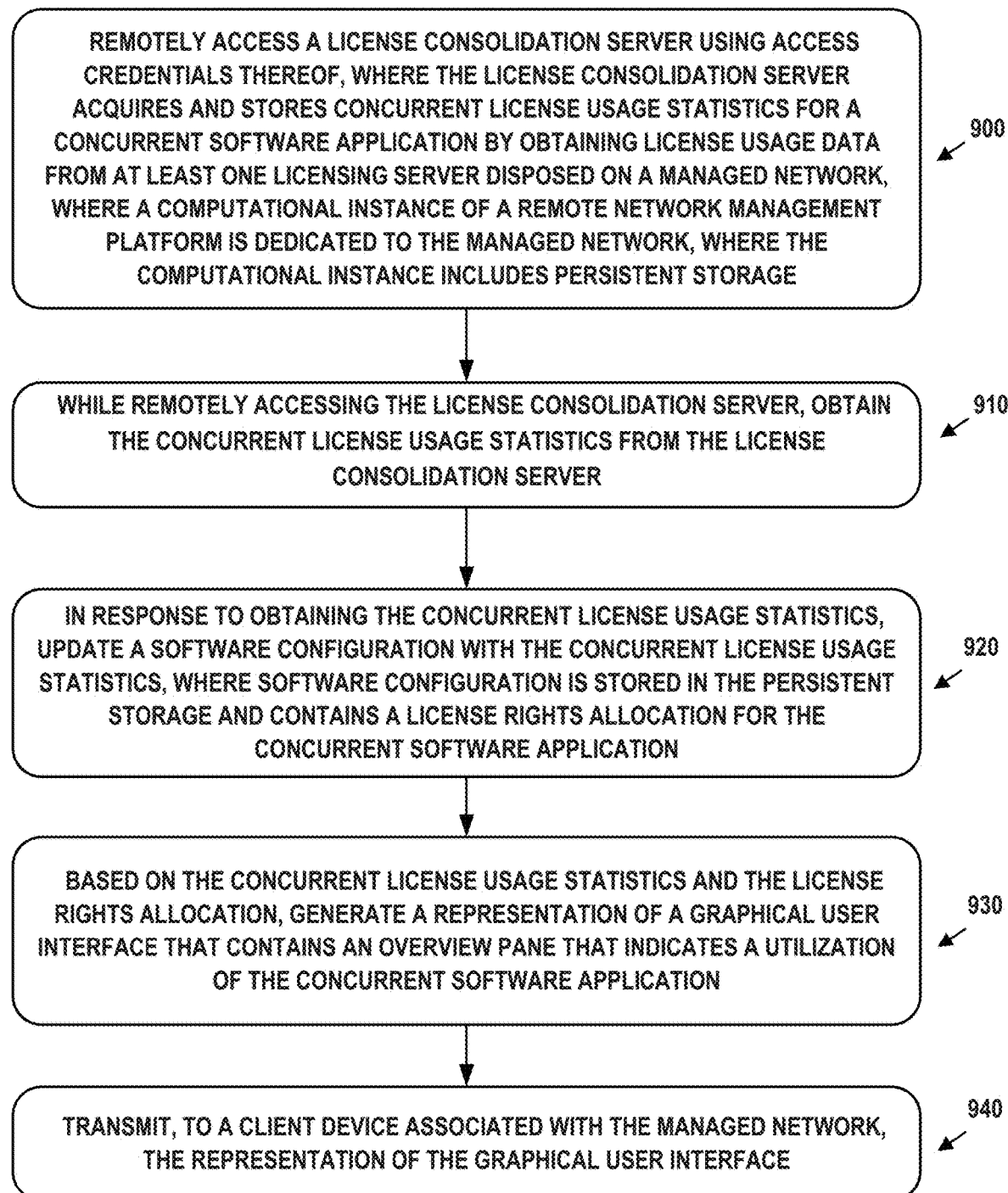
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

Block 900 involves remotely accessing a license consolidation server using access credentials thereof, where license consolidation server acquires and stores concurrent license usage statistics for a concurrent software application by obtaining license usage data from at least one licensing server disposed on a managed network, where a computational instance of a remote network management platform is dedicated to the managed network, where the computational instance includes persistent storage.

Block 910 involves, while remotely accessing the license consolidation server, obtaining the concurrent license usage statistics from the license consolidation server.

Block 920 involves, in response to obtaining the concurrent license usage statistics, updating a software configuration with the concurrent license usage statistics, where the software configuration is stored in the persistent storage and contains a license rights allocation for the concurrent software application.

Block 930 involves, based on the concurrent license usage statistics and the license rights allocation, generating a representation of a graphical user interface that contains an overview pane that indicates a utilization of the concurrent software application.

Block 940 involves transmitting, to a client device associated with the managed network, the representation of the graphical user interface.

In some embodiments, the license consolidation server provides second concurrent license usage statistics for a second concurrent software application by obtaining license usage data from at least one licensing server disposed on the managed network. The embodiments may also involve, while remotely accessing the license consolidation server, obtaining the second concurrent license usage statistics from the license consolidation server. The embodiments may also involve, in response to obtaining the second concurrent license usage statistics, updating a second software configuration with the second concurrent license usage statistics, where the second software configuration is stored in the persistent storage, where the second software configuration contains a second license rights allocation for the second concurrent software application, and where the overview pane of the graphical user interface further indicates a second utilization of the second concurrent software application.

Some embodiments involve remotely accessing a second license consolidation server using access credentials thereof, where the second license consolidation server provides second concurrent license usage statistics for a second concurrent software application by obtaining license usage data from at least one licensing server disposed on the managed network. The embodiments may also involve while remotely accessing the second license consolidation server, obtaining the second concurrent license usage statistics from the second license consolidation server. The embodiments may also involve upon obtaining the second concurrent license usage statistics, updating a second software configuration with the second concurrent license usage statistics, where the second software configuration is stored in the persistent storage, where the second software configuration contains a second license rights allocation for the second concurrent software application, and where the overview pane of the graphical user interface further indicates a second utilization of the second concurrent software application.

In some embodiments, the license consolidation server is disposed in the managed network.

In some embodiments, the license consolidation server is disposed in a remote cloud-based environment distinctly separate from the managed network.

In some embodiments, the computational instance and the license consolidation server are operated by different entities.

In some embodiments, the license consolidation server obtains the license usage data by way of one or more software agents installed onto the at least one licensing server disposed on the managed network.

In some embodiments, the representation of the graphical user interface further contains a number of denials for the concurrent software application.

In some embodiments, the representation of the graphical user interface further contains a list-based view for active users on the managed network, where the list-based view specifies in line items that include: (i) a user ID, (ii) a computing device associated with the user ID, and (iii) a total duration of an active session for a user associated with the user ID.

In some embodiments, the representation of the graphical user interface further contains a list-based view for idle users on the managed network, where the list-based view specifies in line items that include: (i) a user ID, (ii) a computing device associated with the user ID, and (iii) a total duration of an idle session for a user associated with the user ID.

In some embodiments, the representation of the graphical user interface further contains a list-based view for denied users on the managed network, where the list-based view specifies in line items that include: (i) a user ID, (ii) a computing device associated with the user ID, and (iii) a total number of denials for a user associated with the user ID.

In some embodiments, the representation of the graphical user interface further includes a graph-based view that display: (i) a number of available concurrent licenses plotted over time, and (ii) a usage count of concurrent licenses plotted over time.

In some embodiments, the representation of the graphical user interface further includes pie charts that display: (i) a total number of denials per concurrent software application, (ii) a total number of denials per user group, and (iii) a total number of denials per project.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a computational instance including persistent storage, wherein the computational instance is dedicated to a managed network; and
one or more processors configured to:
remotely access a license consolidation server using access credentials thereof, wherein the license consolidation server acquires and stores concurrent license usage statistics for a concurrent software application by obtaining license usage data from at least one licensing server disposed on the managed network;
while remotely accessing the license consolidation server, obtain the concurrent license usage statistics from the license consolidation server;
in response to obtaining the concurrent license usage statistics, update a software configuration with the concurrent license usage statistics, wherein the software configuration is stored in the persistent storage, and wherein the software configuration contains a license rights allocation for the concurrent software application;
based on the concurrent license usage statistics and the license rights allocation, generate a representation of a graphical user interface, wherein the graphical user interface contains an overview pane that indicates a utilization of the concurrent software application; and
transmit, to a client device associated with the managed network, the representation of the graphical user interface.

2. The system of claim 1, wherein the license consolidation server provides second concurrent license usage statistics for a second concurrent software application by obtaining second license usage data from at least one second licensing server disposed on the managed network, and wherein the one or more processors are further configured to:
while remotely accessing the license consolidation server, obtain the second concurrent license usage statistics from the license consolidation server; and
in response to obtaining the second concurrent license usage statistics, update a second software configuration with the second concurrent license usage statistics, wherein the second software configuration is stored in the persistent storage, wherein the second software configuration contains a second license rights allocation for the second concurrent software application, and wherein the overview pane of the graphical user interface further indicates a second utilization of the second concurrent software application.

3. The system of claim 1, wherein the one or more processors are further configured to:
remotely access a second license consolidation server using second access credentials thereof, wherein the second license consolidation server provides second concurrent license usage statistics for a second concurrent software application by obtaining second license usage data from at least one second licensing server disposed on the managed network;
while remotely accessing the second license consolidation server, obtain the second concurrent license usage statistics from the second license consolidation server; and
in response to obtaining the second concurrent license usage statistics, update a second software configuration with the second concurrent license usage statistics, wherein the second software configuration is stored in the persistent storage, wherein the second software configuration contains a second license rights allocation for the second concurrent software application, and wherein the overview pane of the graphical user interface further indicates a second utilization of the second concurrent software application.

4. The system of claim 1, wherein the license consolidation server is disposed in the managed network.

5. The system of claim 1, wherein the license consolidation server is disposed in a remote cloud-based environment distinctly separate from the managed network.

6. The system of claim 1, wherein the computational instance and the license consolidation server are operated by different entities.

7. The system of claim 1, wherein the license consolidation server obtains the license usage data by way of one or more software agents installed onto the at least one licensing server disposed on the managed network.

8. The system of claim 1, wherein the representation of the graphical user interface further contains a number of denials for the concurrent software application.

9. The system of claim 1, wherein the representation of the graphical user interface further contains a list-based view for active users on the managed network, wherein the list-based view specifies in line items that include: (i) a user ID, (ii) a computing device associated with the user ID, and (iii) a total duration of an active session for a user associated with the user ID.

10. The system of claim 1, wherein the representation of the graphical user interface further contains a list-based view for idle users on the managed network, wherein the list-based view specifies in line items that include: (i) a user ID, (ii) a computing device associated with the user ID, and (iii) a total duration of an idle session for a user associated with the user ID.

11. The system of claim 1, wherein the representation of the graphical user interface further contains a list-based view for denied users on the managed network, wherein the list-based view specifies in line items that include: (i) a user ID, (ii) a computing device associated with the user ID, and (iii) a total number of denials for a user associated with the user ID.

12. The system of claim 1, wherein the representation of the graphical user interface further includes a graph-based view that display: (i) a number of available concurrent licenses plotted over time, and (ii) a usage count of concurrent licenses plotted over time.

13. The system of claim 1, wherein the representation of the graphical user interface further includes pie charts that display: (i) a total number of denials per concurrent software application, (ii) a total number of denials per user group, and (iii) a total number of denials per project.

14. A computer-implemented method comprising:
remotely accessing a license consolidation server using access credentials thereof, wherein the license consolidation server acquires and stores concurrent license usage statistics for a concurrent software application by obtaining license usage data from at least one licensing server disposed on a managed network, wherein a computational instance of a remote network management platform is dedicated to the managed network, and wherein the computational instance includes persistent storage;

while remotely accessing the license consolidation server, obtaining the concurrent license usage statistics from the license consolidation server;

in response to obtaining the concurrent license usage statistics, updating a software configuration with the concurrent license usage statistics, wherein the software configuration is stored in the persistent storage, and wherein the software configuration contains a license rights allocation for the concurrent software application;

based on the concurrent license usage statistics and the license rights allocation, generating a representation of a graphical user interface, wherein the graphical user interface contains an overview pane that indicates a utilization of the concurrent software application; and transmitting, to a client device associated with the managed network, the representation of the graphical user interface.

15. The computer-implemented method of claim 14, wherein the license consolidation server provides second concurrent license usage statistics for a second concurrent software application by obtaining second license usage data from at least one second licensing server disposed on the managed network, and wherein the method further comprises:

while remotely accessing the license consolidation server, obtaining the second concurrent license usage statistics from the license consolidation server; and in response to obtaining the second concurrent license usage statistics, updating a second software configuration with the second concurrent license usage statistics, wherein the second software configuration is stored in the persistent storage, wherein the second software configuration contains a second license rights allocation for the second concurrent software application, and wherein the overview pane of the graphical user interface further indicates a second utilization of the second concurrent software application.

16. The computer-implemented method of claim 14, further comprising:

remotely accessing a second license consolidation server using second access credentials thereof, wherein the second license consolidation server provides second concurrent license usage statistics for a second concurrent software application by obtaining second license usage data from at least one second licensing server disposed on the managed network;

while remotely accessing the second license consolidation server, obtaining the second concurrent license usage statistics from the second license consolidation server; and upon obtaining the second concurrent license usage statistics, updating a second software configuration with the second concurrent license usage statistics, wherein the second software configuration is stored in the persistent storage, wherein the second software configuration contains a second license rights allocation for the second concurrent software application, and wherein the overview pane of the graphical user interface further indicates a second utilization of the second concurrent software application.

17. The computer-implemented method of claim 14, wherein the computational instance and the license consolidation server are operated by different entities.

18. The computer-implemented method of claim 14, wherein the representation of the graphical user interface further contains a number of denials for the concurrent software application.

19. The computer-implemented method of claim 14, wherein the license consolidation server obtains the license usage data by way of one or more software agents installed onto the at least one licensing server disposed on the managed network.

20. An article of manufacture including a non-transitory computer-readable medium, having stored thereon program instructions that, upon execution by one or more processors, cause the one or more processors to perform operations comprising:

remotely accessing a license consolidation server using access credentials thereof, wherein the license consolidation server acquires and stores concurrent license usage statistics for a concurrent software application by obtaining license usage data from at least one licensing server disposed on a managed network, wherein a computational instance of a remote network management platform is dedicated to the managed network, and wherein the computational instance includes persistent storage;

while remotely accessing the license consolidation server, obtaining the concurrent license usage statistics from the license consolidation server;

in response to obtaining the concurrent license usage statistics, updating a software configuration with the concurrent license usage statistics, wherein the software configuration is stored in the persistent storage, and wherein the software configuration contains a license rights allocation for the concurrent software application;

based on the concurrent license usage statistics and the license rights allocation, generating a representation of a graphical user interface, wherein the graphical user interface contains an overview pane that indicates a utilization of the concurrent software application; and transmitting, to a client device associated with the managed network, the representation of the graphical user interface.

* * * * *